United States Patent
Kimelman et al.

(10) Patent No.: US 12,265,444 B2
(45) Date of Patent: Apr. 1, 2025

(54) SYSTEMS AND METHODS FOR DETECTION OF PERSISTENT FAULTS IN PROCESSING UNITS AND MEMORY

(71) Applicant: NXP B.V., Eindhoven (NL)

(72) Inventors: Paul Kimelman, San Jose, CA (US); Adam Fuks, San Jose, CA (US)

(73) Assignee: NXP B.V., Eindhoven (NL)

( * ) Notice: Subject to any disclaimer, the term of this patent is extended or adjusted under 35 U.S.C. 154(b) by 111 days.

(21) Appl. No.: 18/180,894

(22) Filed: Mar. 9, 2023

(65) Prior Publication Data

US 2024/0303143 A1    Sep. 12, 2024

(51) Int. Cl.
G06F 11/07    (2006.01)

(52) U.S. Cl.
CPC ........ G06F 11/0751 (2013.01); G06F 11/073 (2013.01)

(58) Field of Classification Search
CPC ............................ G06F 11/0751; G06F 11/073
See application file for complete search history.

(56) References Cited

U.S. PATENT DOCUMENTS

| | | | | |
|---|---|---|---|---|
| 5,146,592 A * | 9/1992 | Pfeiffer | ................. | G06F 7/5443 345/545 |
| 10,224,114 B2 * | 3/2019 | Ryu | ....................... | G11C 29/54 |
| 11,126,573 B1 * | 9/2021 | Rohleder | ............. | G06F 13/1668 |
| 2006/0259736 A1 * | 11/2006 | Carver | .................. | G06F 9/3861 711/220 |
| 2010/0325374 A1 * | 12/2010 | Cypher | ............... | G06F 12/0646 711/170 |
| 2018/0018208 A1 * | 1/2018 | Zettler | .................... | G01R 33/09 |
| 2018/0121273 A1 * | 5/2018 | Fortino | ............... | G06F 11/0721 |
| 2019/0312820 A1 * | 10/2019 | Yu | ............................ | H04L 45/74 |
| 2021/0311832 A1 * | 10/2021 | Boschi | .................. | G06F 11/263 |
| 2022/0048525 A1 * | 2/2022 | Tsai | .................. | B60W 50/0098 |

* cited by examiner

Primary Examiner — Matthew M Kim
Assistant Examiner — Matthew N Putaraksa

(57) ABSTRACT

Systems and methods for detection of persistent faults in processing units and memory have been described. In an illustrative, non-limiting embodiment, a Machine Learning (ML) processor includes one or more registers, and a data moving circuit coupled to the one or more registers. The data moving circuit can be configured to select, based upon a first value stored in the one or more registers, an original one of a plurality of parallel handling circuits within the ML processor to obtain an original data processing result. The data moving circuit can also be configured to select, based upon a second value stored in the one or more registers, an alternative one of the plurality of parallel handling circuits to obtain an alternative data processing result that, upon comparison with the original data processing result, provides an indication of a persistent fault in the ML processor.

20 Claims, 4 Drawing Sheets

SYSTEMS AND METHODS FOR DETECTION OF PERSISTENT FAULTS IN PROCESSING UNITS AND MEMORY

FIELD

This disclosure relates generally to processors, and more specifically, to systems and methods for detection of persistent faults in processing units and associated memories.

BACKGROUND

Processors are electronic circuits capable of executing one or more sequences of instructions, tasks, or threads, generically referred to as "operations." A conventional processor has a single processing core and operations are executed in series. In such a processor, if an operation takes a long time to complete (e.g., if its completion depends upon the result of an external event), all subsequent operations must wait in a queue. This waiting period occurs even when the execution of a subsequent operation is independent from that of a preceding operation, and regardless of whether the processing core is otherwise available during that time.

In contrast with conventional processors, a modern processor may have multiple processing cores, which has more recently contributed to the development of multithreading or multitasking techniques usable to improve the utilization of available computing resources. Generally, a multithreading or multitasking processor includes hardware support for switching between different instructions, tasks, or threads more efficiently than conventional processors.

In any type of processor, however, errors may occur.

One type of error includes "transient faults," which typically occur due to interactions between the processor's circuitry and high-energy particles, or other rare disturbances, such as power or ground events.

In some cases, transient faults may impact Random-Access Memories (RAM), flops, latches, or the like. In RAM, for example, memory arrays are often arranged such that one high-energy particle strike may impact 1-bit in one or more words (e.g., adjacent in physical space). In flops, a single strike may impact multiple flops especially with multi-bit flip-flops (e.g., one master latch with 2, 4, or 8 slave latches). In small process geometries, transient errors may also impact adjacent flops. Moreover, power or ground events may have much farther ranging impact, swamping normal methods of detection.

Another type of error includes "persistent faults," which may occur due to natural aging of a processor's silicon structures, the effects of a transient fault not clearing (until chip is depowered or reset), internal state issues, power issues, etc. Examples of persistent faults include stuck-at bits, bits that change their value independently, state combinations that are not able to self-clear, and so on. Power events may also produce state issues that lead to persistent faults.

The detection of transient and persistent faults is expensive and time-consuming. In the event of a processing error, techniques exist to capture state information of the processor at the time of the error. Such state information may include, for instance, register values, pointers, program counters, condition codes, and the like.

Once state information is captured, a debugging tool may then be employed to analyze that information. As the inventors hereof have recognized, however, even in the case of a multithreading processor (or multiple processors), the very debug operations necessary to capture state information may cause the multithreading processor (or other processors) to temporarily halt the execution of other instructions, applications, or threads.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
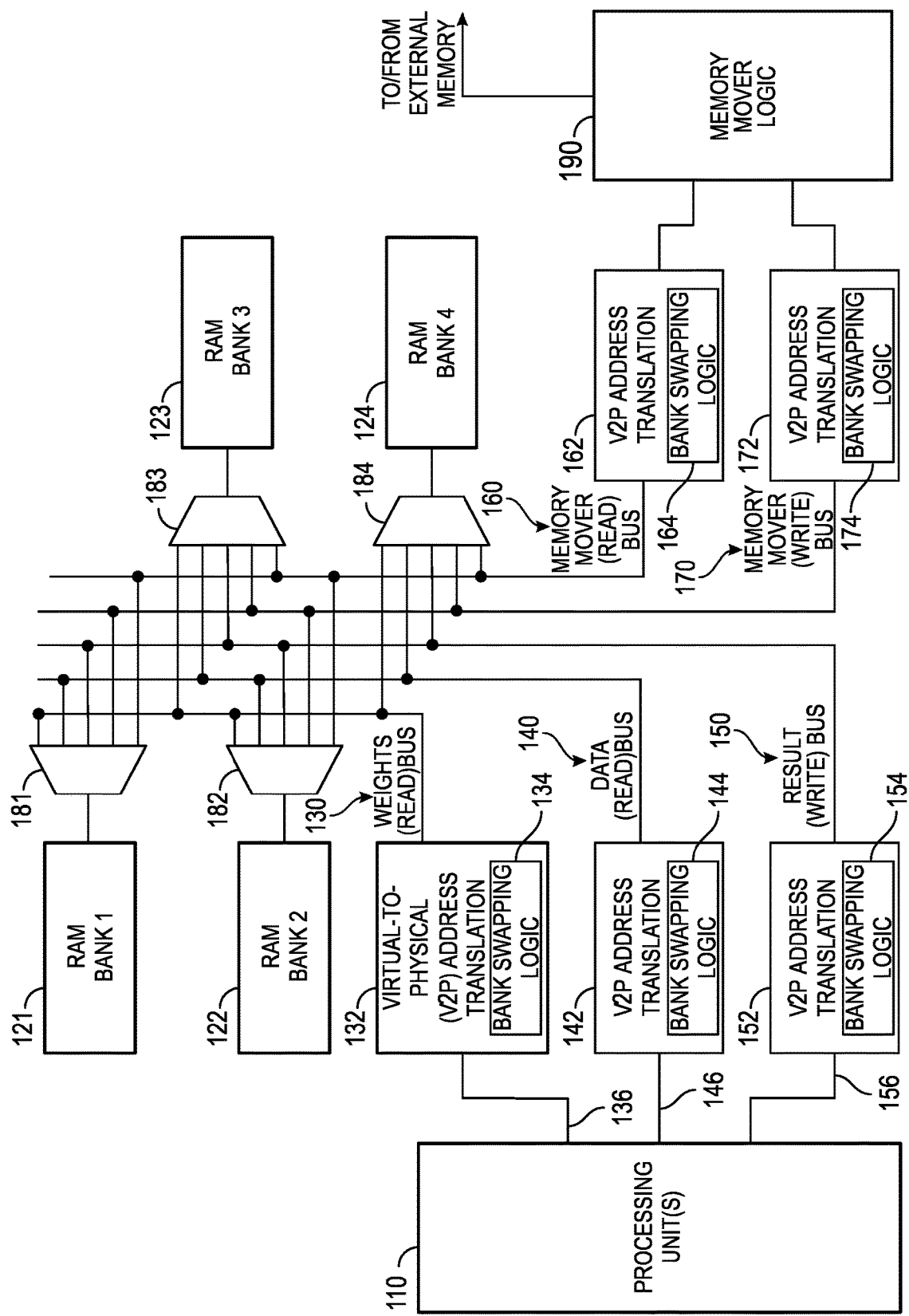
FIG. 1 is a block diagram depicting examples of multiple memory banks configured to implement bank swapping operation(s) usable to detect persistent faults, according to some embodiments.

The detection of persistent faults in processors and memories is difficult and time-consuming. According to conventional wisdom, persistent faults cannot be detected during a processor's normal operation because it is often unclear whether results being produced by the processor are correct when they are consistent across repetitions.

Currently, there are two different approaches to detecting persistent faults: (1) complete replication of the hardware in which the same input data is processed with the replicated hardware, such that the results of the multiple hardware replications may be compared, and (2) software-based hardware checks, such as by running test libraries and verifying the results.

Moreover, as the inventors hereof have recognized, the detection of persistent faults in special-purpose Artificial Intelligence (AI) and Machine Learning (ML) (collectively referred to herein as "ML") systems is even more difficult and time-consuming than general-purpose systems because ML does not have only "one way" to solve a problem. Rather, ML systems learn and adapt without following explicit instructions, by using algorithms and statistical models to analyze and draw inferences from patterns in data.

For example, ML processors or accelerators may be used to bring safety to the operation of a vehicle. In those cases, ML processors may be used to provide Advanced Driver-Assistance Systems (ADAS) to analyze images from outside cameras, cockpit cameras, etc., and other mission-critical environments where a few pixel changes in an image may lead to a completely unrelated classification or detection by the ML processor.

Standards, such as automotive safety integrity level (ASIL), may be used to provide a deterministic level of safety (e.g., reliability and robustness). However, even when ASIL is followed, the detection of persistent faults otherwise needed to evaluate the ML hardware more comprehensively is often overlooked.

In contrast with traditional approaches, embodiments of systems and methods described herein provide detection of persistent faults in special-purpose, ML processors and memories without utilizing a high software overhead, and without complete replication of the hardware. These embodiments may detect persistent faults with only minimal additional hardware.

For example, systems and methods described herein may provide for the detection of damaged hardware that outputs consistently incorrect results. Additionally, or alternatively, these systems and methods may provide for the detection of persistent faults specific to ML processors. Additionally, or alternatively, these systems and methods may provide for the checking of persistent faults while also checking also for transient faults. Additionally, or alternatively, these systems and methods may be used to check for transient faults, while exploiting new hardware capabilities to check for persistent faults. Additionally, or alternatively, these systems and methods may detect persistent faults without producing extra work for a processor's software or firmware, and with minimal additional hardware. Additionally, or alternatively, these systems and methods may provide for a set of hardware solutions configured to facilitate the detection of persistent faults. Additionally, or alternatively, these systems and methods may provide hardware automation to transparently control an electronic device's operating environment so that persistent problems across the wide range of circuit or logic may be detected inexpensively.

Certain embodiments of the systems and methods described herein focus on high-end acceleration of Convolutional Neural Networks (CNNs) and Recurrent Neural Networks (RNNs), with applications such as real-time image related classification and object detection, as well as temporal processing of information such as object tracking, sensor, and control-based optimization, tuning, maintenance analysis, etc. However, other embodiments may be used with ML processors designed to implement other types of ML algorithms, and still other embodiments may detect persistent faults in other types of systems that are not specifically geared toward ML.

Some embodiments described herein may detect persistent faults by swapping or rotating existing hardware used between different runs, where the different runs perform the same computation twice on the same data. Other embodiments may detect persistent faults by swapping or rotating the hardware used on different runs, when running the calculation again on new data, where the data is similar from one computation to the next. These other embodiments may use the result-filter to detect output that is too far from what would be otherwise considered normal.

There may be different techniques for swapping or rotating the hardware used, depending on which component of the hardware is being swapped or rotated. Two examples of the many types of hardware that may be swapped or rotated include: (i) memory, and (ii) processing units. However, these two examples should not be construed as limiting the types of hardware that may be swapped or rotated in order to detect persistent faults.

First, swapping or rotating the memory used may involve a hidden swapping or rotating of memory banks for each run, so that two runs will in reality use different banks for the same (or similar) data. In some implementations, there may be no change in the software and no performance impact versus running the computation twice anyways (where the computation may be run either on the same data or different data). Furthermore, these embodiments may be capable of detecting both persistent and transient faults without added power and cost, and without the high burden of parity or Error Correction Code (ECC), which may work against access methods.

Second, swapping or rotating processing units used for each run may involve different processing units to process the same (or similar) data. In these embodiments, a similar approach may be used for selecting among processing units. If problems exist in any flip-flops, multipliers, adders, shifters, or control circuit or logic of a processing unit, the impact manifests itself in the form of inconsistent results. In some implementations, there may be no change in the software and no performance impact versus running the computation twice. These systems and methods may select different multiplier/math pipelines to perform mathematical operations, such as convolutions, as well as activations.

FIG. 1 is a block diagram depicting examples of multiple banks of RAM (121, 122, 123, 124) configured to implement bank swapping operation(s) while communicating with external memory through memory mover circuit or logic (190), and while communicating with one or more processing unit (110), in order to detect persistent faults in the memory.

In this example, each of four RAM banks (121, 122, 123, 124) has five different busses coupled thereto: (1) a weights (read) bus 130, where a processing unit 110 may read data regarding weights (which may be then applied to its computations) from the memory (the processing unit supplies the address on the bus, and the appropriate RAM bank responds with the addressed weights); (2) a data (read) bus 140, where a processing unit 110 may read data from the memory (the processing unit supplies the address on the bus, and the appropriate RAM bank responds with the addressed data); (3) a results (write) bus 150, where a processing unit 110 may write data to the memory (the processing unit supplies the address and the data to the bus, and the data is written to the appropriate RAM bank); (4) a memory mover (read) bus 160, where the memory mover circuit or logic 190 may read data from a RAM bank to external memory (the memory mover circuit or logic 190 supplies the address on the bus, and the appropriate RAM bank responds with the addressed data); and (5) a memory mover (write) bus 170, where the memory mover circuit or logic 190 may write data to a RAM bank from external memory (the memory mover circuit or logic 190 supplies the address and the data to the bus, and the data is written to the appropriate RAM bank).

Bus selectors (181, 182, 183, 184) may select which of the 5 busses should be used to access the corresponding RAM bank based on the higher order address bits of the address lines of the bus. The bus selectors (181, 182, 183, 184) may also include bus contention features in case multiple buses attempt to address the same RAM bank at the same time.

For each bus that reads or writes to a bank of memories, the banked memory means that part of the address decoding (for the higher order bits of the address bus) is done outside of the memories. For example, if each bank were 4 KB, then address bits 11:0 would be within the 4 KB memory, but address bits N:12 would select the bank, where N is sized based on how many banks. An automation model may rotate or swap the bits N:12 on each run using the bank swapping circuit or logic (134, 144, 154, 164, 174) for each of the buses, so that two different runs would use different banks and busing to those banks. In some embodiments, this may be done without knowledge of the software or other components.

For example, if a processing unit 110 needs to read data from RAM bank 1 (121), it may have address bits N:12 of the address portion of the data (read) bus 140 set to 0x1. If those bits were swapped (by the bank swapping circuit or logic 144) such that N:12 became 0x4, then its reads would be reading RAM bank 4 (124) instead. Since this would be set before a run starts, the memory mover circuit or logic 190 would also write to RAM bank 4 (124) using the memory mover (write) bus 170. The bank swapping circuit or logic 174 would swap the higher order bits N:12 of the address portion of the memory mover (write) bus 170 from 0x1 to became 0x4.

Therefore, if there was a problem in RAM bank 1 (121), then one run would yield different results when using RAM bank 1 (121), in contrast with another run, which was using RAM bank 4 (124) (which does not have that problem). Instead, a problem with RAM bank 1 (121) would affect another use (e.g., what used to use RAM bank 4 (124)), and so the results would be quite different between two runs. The specific transform mechanism may include a rotation, swap, or other method as long as each input yields a unique output. If the bank is divided into halves or quarters or other structure, then swaps that change the structural part may be useful in case of issues relative to that.

FIG. 1 further depicts additional details of the bank swapping process occurring during a virtual-to-physical address translation. Here it is assumed that the processing units 110 and memory mover circuit or logic 190, which accesses the external memory, use virtual addressing. This virtual addressing is converted into physical addresses to access the RAM.

For example, virtual-to-physical (V2P) address translation component 132 may convert the virtual address on the weights bus 136 from the processing unit(s) 110 to a physical address on the weights bus (130) provided to the RAM banks. Bank swapping circuit or logic 134 then swaps the higher order bits of the physical address of the weights bus (130) to address a different RAM bank.

As another example, V2P address translation component 142 may convert the virtual address on the data bus 146 from the processing unit(s) 110 to a physical address on the data (read) bus (140) provided to the RAM banks. Bank swapping circuit or logic 144 then swaps the higher order bits of the physical address of the data (read) bus (140) to address a different RAM bank.

As yet another example, V2P address translation component 152 may convert the virtual address on the results bus 156 from the processing unit(s) 110 to a physical address on the result (write) bus (150) provided to the RAM banks. Bank swapping circuit or logic 154 then swaps the higher order bits of the physical address of the result (write) bus (150) to address a different RAM bank.

As still another example, V2P address translation component 162 may convert the virtual address on the memory mover (read) bus from the memory mover circuit or logic 190 to a physical address on the memory mover (read) bus (160) provided to the RAM banks. Bank swapping circuit or logic 164 then swaps the higher order bits of the physical address of the memory mover (read) bus (160) to address a different RAM bank.

As yet another example, V2P address translation component 172 converts the virtual address on the memory mover (write) bus from the memory mover circuit or logic 190 to a physical address on the memory mover (write) bus (170) provided to the RAM banks. Bank swapping circuit or logic 174 then swaps the higher order bits of the physical address of the memory mover (write) bus (170) to address a different RAM bank.

In some embodiments, along with the hardware automation to manage the transform, a status to show it is working may be used. In some of these embodiments, a check the checker approach may be used to ensure the system is active. Alternatively, quick patterns may be written such that the hardware is told a new inference is being run, and a read-back may be used to show different banks for the data written.

Because the execution of ML algorithms is extremely memory intensive, FIG. 1 depicts a solution that uses I/O to move data between external and internal memory, rather than having huge memories on a die/chip. Given the high latencies of moving memory on and off chip, this means local caches or buffers may be used on chip to hold working data.

One approach may include: loading the memory from the outside, running a computation, writing results, then repeating. In many cases, however this would cause the I/O to consume a large portion of the time and to reduce utilization of the compute components to a small percentage (i.e., low efficiency).

Another approach, however, may include moving data between internal and external memories concurrently with compute operations. This way the I/O time is hidden, and any external memory latency may be removed because the needed data remains local.

In some implementations, to avoid the additional costs and complexities associated with using a 2-port memory, one option is to divide memory into banks (121, 122, 123, 124). This means many smaller memories allows the processing unit(s) 110 to be using some while the memory mover circuit or logic 190 is using others. One example would be a ping-pong buffer model where the mover loads 'pong' while the compute reads 'ping', then they swap. In addition, the ML architecture may handle weights 130, data (from a previous layer) 140, and results 150 as they move across the system.

Figure 2:
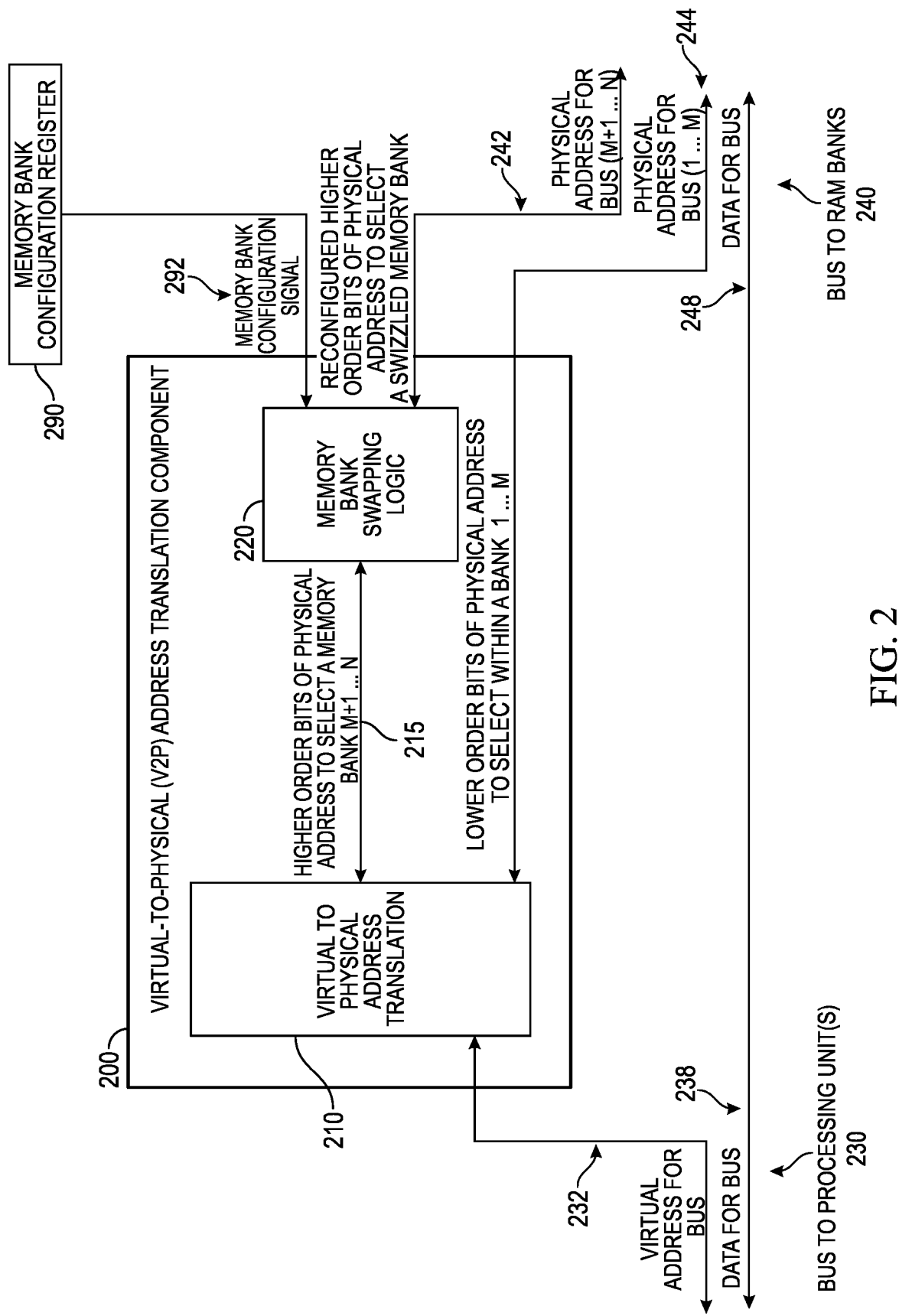
FIG. 2 is a block diagram depicting an example of a virtual-to-physical address translation component configured to implement bank swapping operation(s) usable to detect persistent faults, according to some embodiments.

FIG. 2 is a block diagram depicting an example of V2P address translation component 200 configured to implement swapping(s) in the memory bank swapping circuit or logic 220 while communicating with memory using a bus to RAM banks 240, in order to detect persistent faults in the memory. Particularly, FIG. 2 provides additional details that may apply to the V2P address translation components of FIG. 1.

The embodiment shown in FIG. 2 depicts a bus-to-processing unit(s) 230 and a bus to RAM banks 240. Therefore, the specific embodiment of FIG. 2 may apply to any of the three V2P address translation components (132, 142, and 152) of FIG. 1 that communicate between the processing unit(s) 110 and the RAM banks (121, 122, 123, 124). However, the operations of the V2P address translation component 200 of FIG. 2 may apply to any of the V2P address translation components (132, 142, 152, 162, 172) of FIG. 1 that service any of the busses: weights bus 130, data bus 140, results bus 150, memory mover (read) bus 160, or memory mover (write) bus 170.

The data bus is not processed between the processing unit(s) 110 and the RAM banks (121, 122, 123, 124). Therefore, in FIG. 2, the data for bus 238 that is part of the bus to the processing unit(s) 230 is routed directly to the data for bus 248 which is part of the bus to the RAM banks 240. The data portion of the bus is not processed by the V2P address translation component 200.

The address of the bus, however, is processed by the V2P address translation component 200. The virtual address 232 received from the bus to the processing unit(s) 230 is input to a virtual-to-physical address translation 210 which converts the address to a physical address. The lower order bits of the physical address (1 ... M) (244) are used to select data within a bank of memory, and so are routed to the lower order address bits of the bus to the RAM banks 240. The higher order bits of the physical address (M+1 . . . N) (215) are used to select one of the RAM banks. These bits may be modified by memory bank swapping circuit or logic (220).

The memory bank swapping circuit or logic 220 is controlled by a memory bank configuration signal 292 from a memory bank configuration register 290. Depending on the bank configuration signal 292, the memory bank swapping circuit or logic 220 might swap or rotate certain banks with other banks, or in an "off" state might not perform any swapping or rotating at all.

The reconfigured higher order bits of the physical address (M+1 . . . N) (242) are output by the memory bank swapping circuit or logic 220. These reconfigured higher order bits of the physical address are used to select the swapped or rotated memory bank, as part of the bus to the RAM banks 240.

Figure 3:
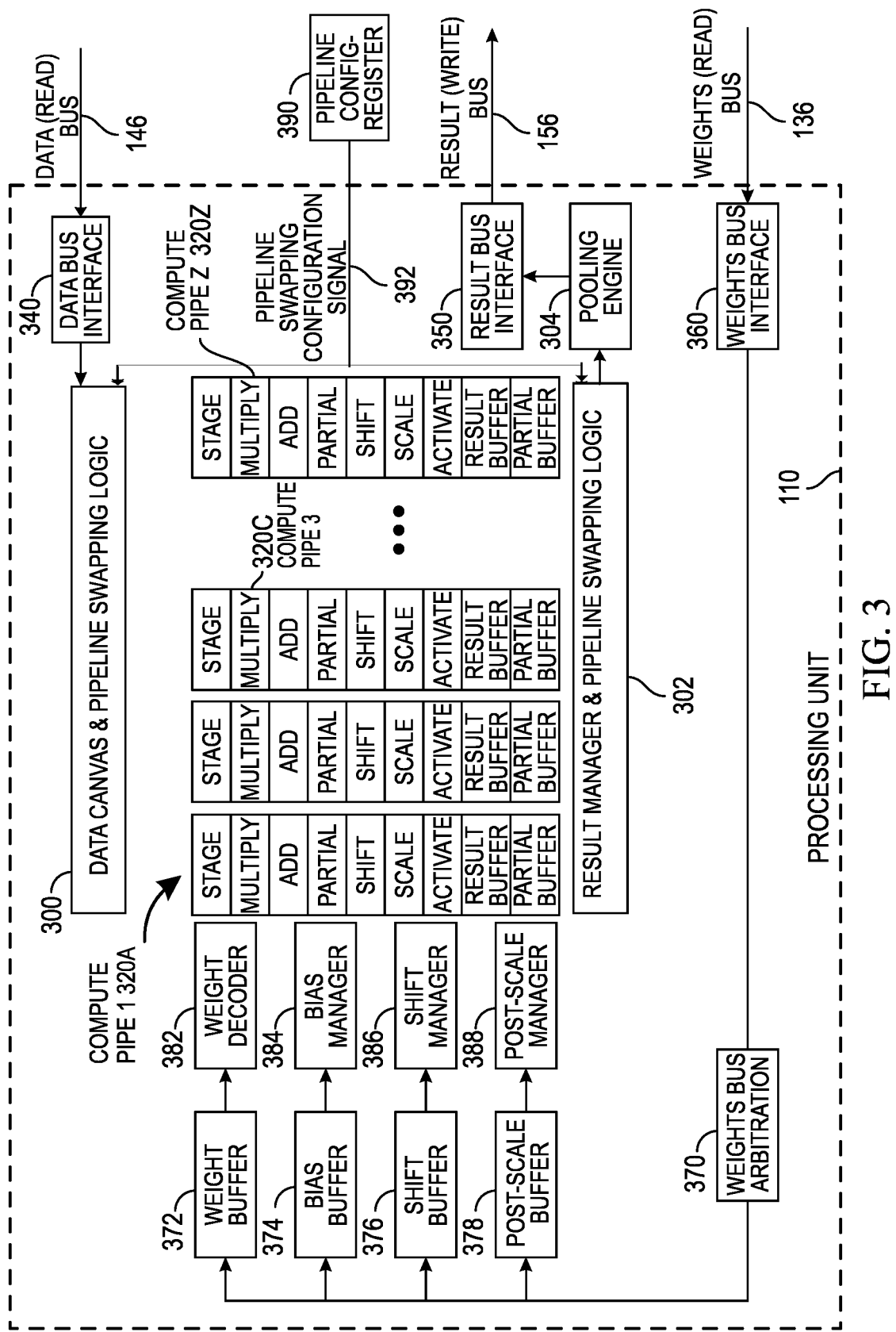
FIG. 3 is a block diagram depicting an example of a processing unit with multiple compute pipes configured to implement pipeline swapping operation(s) usable to detect persistent faults, according to some embodiments.

FIG. 3 is a block diagram depicting an example of processing unit 110 with multiple compute pipes (320A . . . 320Z) configured to implement pipeline swapping operation(s) in order to detect persistent faults in the processing unit.

In a processor, the term SIMD (single instruction, multiple data) is used when multiple independent or semi-dependent operations are done in parallel, but there are serious limitations to how far this may be taken. This is an issue in ML, since ML is not just one operation or kind of operation but rather a series of heterogeneous operation types (e.g., many accumulated multiplies and then some form of post activation).

Therefore, SIMD tends to be mixed back and forth between SIMD and serial processing, losing time in the serialization. Processors are usually quite limited, also in the data feed width, so may only parallelize a small amount because they cannot get enough data. This is true of most Digital Signal Processors (DSPs) as well.

Vector Processing Units (VPUs) and DSPs are designed to move wider data and so more parallelism. However, most vector processors have struggles over data feed rates and rely on repetitive computation to buy time. For example, larger matrix operations involve many multiply/accumulates of the same data, there lower bandwidth from the outside. Vector solutions usually struggle as more unique data is used, and this is typical of most modern ML networks.

Pure parallel processing, as many of a range of divide and conquer solutions, provides the most degrees of freedom, as long as it may be fed enough data. ML may require a variable number of multiply or accumulate operations (based on layer in a network) followed by activation or normalization, or both. In some embodiments, this may include de-quantization as well, which reverts the data back from accumulator size to the smaller data sizes needed for the next layer.

Therefore, a parallel processing mechanism which has a set of identical or near identical feeds allows for those to be swapped as well. For example, if there is an 8 across array of compute pipes, compute pipes 0 and 1 may be swapped, compute pipes 2 and 3 may be swapped, etc.

Swapping changes which compute pipes gets the data for the layer, and also swaps the output to go to where it should be. For example, if 0 and 1 are swapped for input, then output of 0 and 1 are swapped so the output appears normal. This swapping ensures that in 2 runs, the results would be different if there are any persistent issues in the feed path. This may include multipliers, adders, scalers, shifters, staging flops, buffers, partial value stores, etc.

In the embodiment of FIG. 3, the various parallel processing mechanisms are represented by the compute pipes 1 to Z (320A . . . 320Z). Each of these compute pipelines have multiple steps. These steps of the pipeline may include: staging of data, multiplying, accumulating, adding, partial, shifting, scaling, activating, a result buffer, and a partial buffer.

The weights bus interface 360 may interface with the weights (read) bus 136 to provide configurations to inform the operations and computations of the various compute pipes through a weights bus arbitration component 370. The weights (read) bus 136 may provide weights, biases, shifting configurations, and post-scaling information that may be used by the various steps of the compute pipes (320A . . . 320Z).

The weights bus arbitration 370 may provide weights from the weights (read) bus 136 to a weight buffer 372, which then provides the weights to a weight decoder 382 for pipeline computations. Similarly, the weights bus arbitration 370 may provide biases from the weights (read) bus 136 to a bias buffer 374, which then provides the biases to a bias manager 384 for pipeline computations. Similarly, the weights bus arbitration 370 may provide shifting information from the weights (read) bus 136 to a shift buffer 376, which then provides the shifting information to a shift manager 386 for pipeline computations. Similarly, the weights bus arbitration 370 may provide post-scaling information from the weights (read) bus 136 to a post-scale buffer 378, which then provides the post-scaling information to a post-scale manager 388 for pipeline computations.

The data canvas and pipeline swapping circuit or logic 300 receives data from the data (read) bus 146 through the data bus interface 340. The data canvas 300 supplies the appropriate data to the appropriate compute pipe (320A . . . 320Z). The appropriate compute pipe to supply the data to is determined by the pipeline swapping circuit or logic of the data canvas 300. The pipeline swapping circuit or logic 300 receives a pipeline swapping configuration signal 392 from a pipeline configuration register 390.

The pipeline swapping configuration signal 392 communicates to the pipelines swapping circuit or logic 300 whether to swap pipelines, and what configuration to use when swapping pipelines. Swapping changes which compute pipes gets the data for the layer. For example, the pipeline swapping configuration signal 392 might tell the pipeline swapping circuit or logic 300 that compute pipes 1 and 2 should be swapped for input.

The result manager and pipeline swapping circuit or logic 302 collects the results and also swaps the output to go to where it should be. The pipeline swapping circuit or logic 300 receives a pipeline swapping configuration signal 392 from a pipeline configuration register 390.

The pipeline swapping configuration signal 392 communicates to the pipelines swapping circuit or logic 302 of the results manager whether to swap pipelines, and what configuration to use when swapping pipelines. For example, the pipeline swapping configuration signal 392 might communicate to the pipeline swapping circuit or logic 300 that compute pipes 1 and 2 should be swapped for the output, as they were for the input, so the output appears normal.

A pooling engine 304 may pool the results of the re-swapped output from the result manager and pipeline swapping circuit or logic 302. The pooling engine 304 may provide the results to a result bus interface 350 that then sends them to the appropriate RAM bank through the result (write) bus 156.

Figure 4:
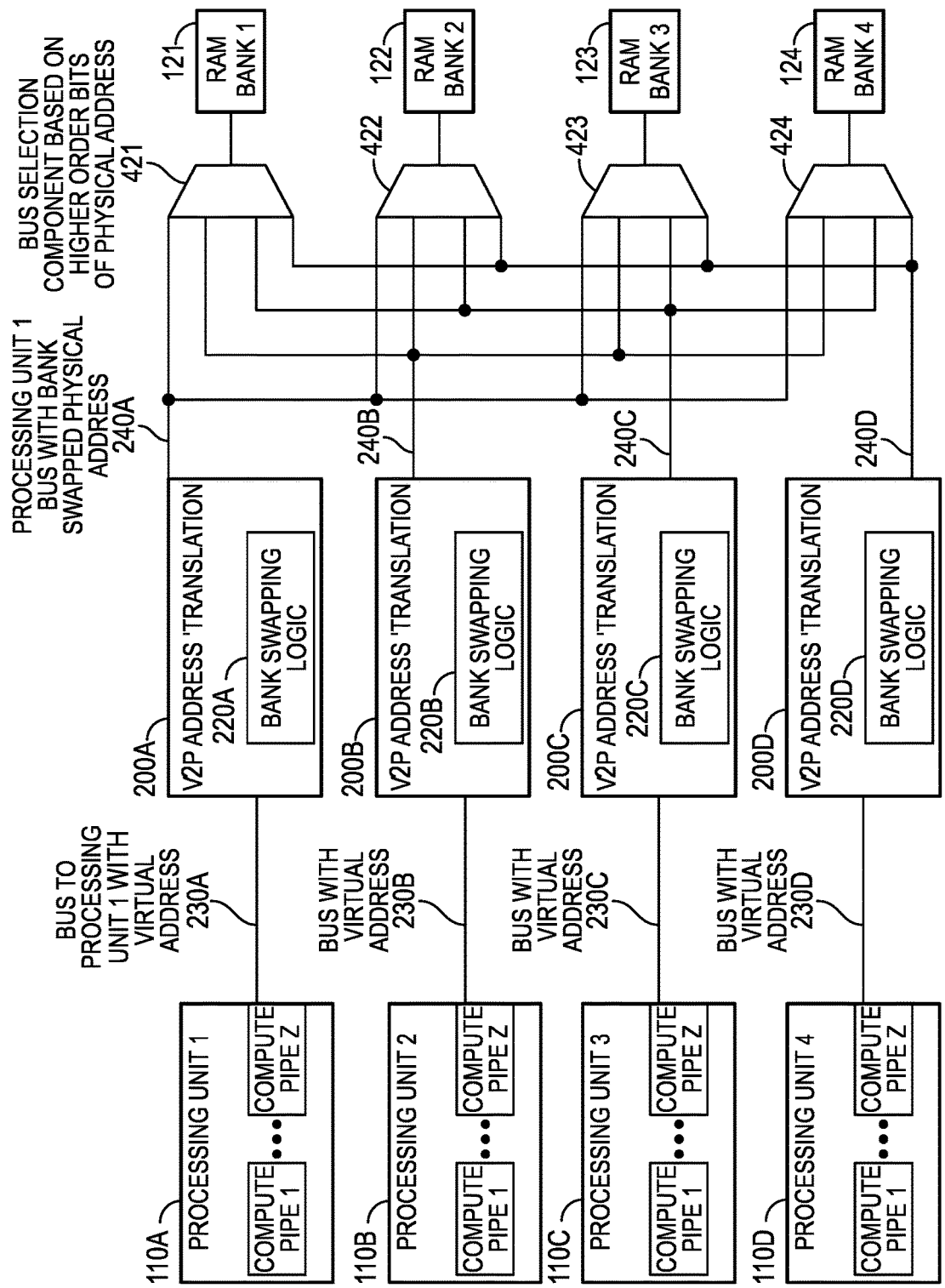
FIG. 4 is a block diagram depicting examples of multiple processing units in communication with multiple memory banks to implement bank swapping operation(s) usable to detect persistent faults, according to some embodiments.

FIG. 4 is a block diagram depicting examples of multiple processing units (110A-D) in communication with multiple banks of memory (121, 122, 123, 124) to implement bank swapping operation(s) (220A, 220B, 220C, 220D) in order to detect persistent faults in the memory, according to some embodiments. Each processing unit (110A-D) might, in turn, contain multiple compute pipes.

In other embodiments, the processing units might only contain one compute pipe. The embodiment of FIG. 4 simplifies that of FIG. 1 in that it only shows one bus that connects the processing units (110A-D) with the multiple banks of memory (121, 122, 123, 124). In other embodiments, however, there may be multiple busses between processing units (110A-D) with multiple banks of memory (121, 122, 123, 124) as in FIG. 1.

Each processing unit (110A-D) is connected to a V2P address translation component (200A-D, respectively) by a bus that uses a virtual address (230A-D, respectively). For example, processing unit 1 communicates using a virtual address on bus 230A.

Bus 230A is provided to V2P address translation component 200A, which includes bank swapping circuit or logic 220A. V2P address translation component 200A converts the virtual address on bus 230A from the processing unit 110A to a physical address on bus 240A. Bus 240A is provided to the RAM banks with a bank swapped physical address. Bank swapping circuit or logic 220A swaps the higher order bits of the physical address of the converted physical address from bus 230A to address a different RAM bank, depending on the configuration.

Bus selection components (421, 422, 423, 424) may select which of the 4 busses from which of the 4 processing units (110A-D) should be used to access the corresponding RAM bank, based on the higher order address bits of the swapped physical address lines of buses (240A-D) output by the corresponding V2P address translation components (200A-D). The bus selection components (421, 422, 423, 424) may also include bus contention features in case multiple buses attempt to address the same RAM bank at the same time.

For each bus that reads or writes to a bank of memories, the banked memory means that part of the address decoding (for the higher order bits of the address bus) is done outside of the memories. For example, if each bank were 4 KB, then address bits 11:0 would be within the 4 KB memory, but address bits N:12 would select the bank, where N is sized based on how many banks.

An automation model may be employed to rotate or swap the bits N:12 on each run using the bank swapping circuit or logic (220A-D) for each of the buses, so that two different runs would use different banks and busing to those banks. In some embodiments, this may be done without knowledge of the software or other components.

For example, if a processing unit 110A needed to read data from RAM bank 1 (121), it would have address bits N:12 of the address portion of the bus 240A set to 0x1. If those bits were swapped (by the bank swapping circuit or logic 200A) such that N:12 became 0x4, then its reads would be reading RAM bank 4 (124) instead.

Therefore, if there was a problem in RAM bank 1 (121), then one run would yield different results when using RAM bank 1 (121), in contrast with another run, which was using RAM bank 4 (124) (which does not have that problem). Instead, a problem with RAM bank 1 (121) would affect another use (e.g., what used to use RAM bank 4 (124)), so the results would be quite different between two runs.

The specific transform mechanism may include a rotation, swap, or other method as long as each input yields a unique output. If the bank is divided into halves or quarters or other structure, then swaps that change the structural part may be useful in case of issues relative to that partitioning.

In other embodiments, other components that underlying the support of the parallel components may be similarly swapped or offset. For example, buffers/caches may swap indexes to change behavior. They may also be turned off for a portion of one run to ensure any side effects would impact results. Bus slices may swap so that any persistent impacts would show up with variances in the disturbing of data.

In some embodiments, for general components, the hardware may perform a quick "cycling" of some data when starting up or after finishing to confirm components not covered by the above do not contain persistent faults. For example, sending two patterns through to memory and reading back is a quick check of all other parts of the flow to ensure no persistent faults.

As such, systems and methods for detection of persistent faults in processing units and associated memory have been described. In an illustrative, non-limiting embodiment, a Machine Learning (ML) processor includes one or more registers; and a data moving circuit coupled to the one or more registers. The data moving circuit can be configured to select, based upon a first value stored in the one or more registers, an original one of a plurality of parallel handling circuits within the ML processor to obtain an original data processing result. The data moving circuit can also be configured to select, based upon a second value stored in the one or more registers, an alternative one of the plurality of parallel handling circuits to obtain an alternative data processing result that, upon comparison with the original data processing result, provides an indication of a persistent fault in the ML processor.

The original parallel handling circuit of the ML processor can include a first portion of memory, and the alternative parallel handling circuit can include a second portion of memory. The original parallel handling circuit of the ML processor can include a first processing unit, and the alternative parallel handling circuit can include a second processing unit.

The original parallel handling circuit can be configured to handle a first data portion during a first processing run of a series of processing runs to produce the original data processing result. The alternative parallel handling circuit can be configured to handle a second data portion during a second processing run of the series of processing runs to produce the alternative data processing result. The second data portion can be the same as or different from the first data portion. The data moving circuit can be further configured to: provide the first data portion to the original parallel handling circuit during the first processing run, and provide the second data portion to the alternative parallel handling circuit during the second processing run. The second data portion can be the same as the first data portion.

The first data portion can be associated with a first address during the first processing run, where the second data portion can be initially associated with the same first address during the second processing run. The data moving circuit can further include an address modifying circuit configured to modify, during the second processing run, the first address associated with the second data portion to produce a second address, where the second address can be associated with the second data portion during at least part of the second processing run, and where the second address can be different than the first address.

The original parallel handling circuit can includes a first portion of memory, where the alternative parallel handling circuit include a second portion of memory, where the first address can be associated with the first portion of memory, and the second address can be associated with the second portion of memory. The data moving circuit can further include a virtual-to-physical address translation circuit configured to: translate, during the first processing run, a first virtual address associated with the first data portion to a first physical address associated with the original parallel handling circuit; and translate, during the second processing run, the same first virtual address associated with the second data portion to a second physical address associated with the alternative parallel handling circuit, where the second physical address can be different than the first physical address.

To translate, during the second processing run, the same first virtual address associated with the second data portion to the second physical address, the virtual-to-physical address translation circuit of the ML processor can be further configured to: translate, during the second processing run, the same first virtual address associated with the first data portion to the first physical address associated with the original parallel handling circuit; and replace one or more higher order bits of the first physical address with different higher order bits to create the second physical address associated with the alternative parallel handling circuit.

In other illustrative, non-limiting embodiments, a method includes: processing, by a first circuit of the integrated circuit, a first data portion during a first processing run of a series of processing runs to produce a first processed data portion; processing, by a second circuit of the integrated circuit different than the first circuit, a second data portion during a second processing run of the series of processing runs to produce a second processed data portion, where the second data portion can be the same as or different than the first data portion; comparing the first processed data portion and the second processed data portion; and determining, based on the comparison, that either the first circuit or the second circuit includes a persistent fault.

In the method, the second data portion can be the same as the first data portion. The first circuit can include a first portion of memory, and the second circuit can include a second portion of memory. The first data portion can be associated with a first address during the first processing run, where the second data portion can be initially associated with the same first address during the second processing run. The first address can be associated with the first portion of memory, where the second address can be associated with the second portion of memory. The method can further include modifying, during the second processing run, the same first address associated with the second data portion to produce a different second address, where the second address can be associated with the second data portion during at least part of the second processing run.

The first circuit can include a first processing unit, and the second circuit can include a second processing unit. The method can further include: translating, during the first processing run, a first virtual address associated with the first data portion to a first physical address associated with the first circuit; translating, during the second processing run, the same first virtual address associated with the second data portion to a second physical address associated with the second circuit, where the second physical address can be different than the first physical address. The translating, during the second processing run, the same first virtual address associated with the second data portion to the second physical address associated with the second circuit, can further include: translating, during the second processing run, the same first virtual address associated with the first data portion to the first physical address associated with the first circuit; and replacing one or more higher order bits of the first physical address with different higher order bits to create the second physical address associated with the second circuit.

In other illustrative, non-limiting embodiments, another method, includes: receiving a first data portion associated with a first address during a first processing run of a series of processing runs; providing the first data portion to a first integrated circuit during the first processing run, based at least in part on the first address; handling, by the first integrated circuit, the first data portion during the first processing run to produce a first handled data portion; receiving a second data portion associated with the first address during a second processing run of a series of processing runs, where the second data portion can be the same as or different than the first data portion; modifying, during the second processing run, the first address associated with the second data portion to produce a second address associated with the second data portion; providing the second data portion to a second integrated circuit during the second processing run, based at least in part on the second address; handling, by the second integrated circuit, the second data portion during the second processing run to produce a second handled data portion; and determining whether either the first integrated circuit or the second integrated circuit includes a persistent fault, at least in part, by comparing the first handled data portion with the second handled data portion.

The second data portion can be the same as the first data portion. The first integrated circuit can include a first portion of memory. The second integrated circuit can include a second portion of memory. The first integrated circuit can include a first processing unit. The second integrated circuit can include a second processing unit.

In various embodiments, systems and methods described herein may provide for detection of persistent faults in processing units and associated memory in a System-On-a-Chip (SoC), Field-Programmable Gate Array (FPGA), Application-Specific Integrated Circuit (ASIC), or any other suitable data processing system including a plurality of discrete circuits or semiconductor Intellectual Property (IP) cores (collectively referred to as "SoC devices" or simply "devices") disposed in a single electronic or semiconductor package.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of features are envisioned and may fall within the scope of claims that follow. Finally, structures and features presented as discrete components in the example configurations may be implemented as a combined structure or component. These and other variations, modifications, additions, and improvements may fall within the scope of embodiments as defined in the claims that follow. It is intended that the following claims be interpreted to embrace all such modifications and changes and, accordingly, the above description to be regarded in an illustrative rather than a restrictive sense.

The previous detailed description refers to the accompanying drawings that show, by way of illustration, specific details and aspects of this disclosure in which the invention may be practiced. Other aspects may be utilized, and structural, logical, and electrical changes may be made without departing from the scope of the invention. The various aspects of this disclosure are not necessarily mutually exclusive, as some aspects of this disclosure may be combined with one or more other aspects of this disclosure to form new aspects.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

For sake of brevity, conventional techniques related to signal processing, sampling, sensing, analog-to-digital conversion, computer architecture, and PWM, have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined circuits or logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A Machine Learning (ML) processor, comprising:
one or more registers; and
a data moving circuit coupled to the one or more registers and configured to:
select, based upon a first value stored in the one or more registers, an original one of a plurality of parallel handling circuits within the ML processor to obtain an original data processing result; and
select, based upon a second value stored in the one or more registers, an alternative one of the plurality of parallel handling circuits to obtain an alternative data processing result that, upon comparison with the original data processing result, provides an indication of a persistent fault in the ML processor.

2. The ML processor of claim 1, wherein the original parallel handling circuit comprises a first portion of memory, and wherein the alternative parallel handling circuit comprises a second portion of memory.

3. The ML processor of claim 1, wherein the original parallel handling circuit comprises a first processing unit, and wherein the alternative parallel handling circuit comprises a second processing unit.

4. The ML processor of claim 1, wherein the original parallel handling circuit is configured to handle a first data portion during a first processing run of a series of processing runs to produce the original data processing result, wherein the alternative parallel handling circuit is configured to handle a second data portion during a second processing run of the series of processing runs to produce the alternative data processing result, wherein the second data portion is the same as or different from the first data portion, and wherein data moving circuit is further configured to: provide the first data portion to the original parallel handling circuit during the first processing run, and provide the second data portion to the alternative parallel handling circuit during the second processing run.

5. The ML processor of claim 4, wherein the second data portion is the same as the first data portion.

6. The ML processor of claim 4, wherein the first data portion is associated with a first address during the first processing run, wherein the second data portion is initially associated with the same first address during the second processing run, wherein the data moving circuit further comprises an address modifying circuit configured to modify, during the second processing run, the first address associated with the second data portion to produce a second address, wherein the second address is associated with the second data portion during at least part of the second processing run, and wherein the second address is different than the first address.

7. The ML processor of claim 6, wherein the original parallel handling circuit comprises a first portion of memory, wherein the alternative parallel handling circuit comprises a second portion of memory, wherein the first address is associated with the first portion of memory, and the second address is associated with the second portion of memory.

8. The ML processor of claim 4, wherein the data moving circuit further comprises a virtual-to-physical address translation circuit configured to:
translate, during the first processing run, a first virtual address associated with the first data portion to a first physical address associated with the original parallel handling circuit; and
translate, during the second processing run, the same first virtual address associated with the second data portion to a second physical address associated with the alternative parallel handling circuit, wherein the second physical address is different than the first physical address.

9. The ML processor of claim 8, wherein to translate, during the second processing run, the same first virtual address associated with the second data portion to the second physical address, the virtual-to-physical address translation circuit is further configured to:
translate, during the second processing run, the same first virtual address associated with the first data portion to the first physical address associated with the original parallel handling circuit; and
replace one or more higher order bits of the first physical address with different higher order bits to create the second physical address associated with the alternative parallel handling circuit.

10. A method, comprising:
processing, by a first circuit of an integrated circuit, a first data portion during a first processing run of a series of processing runs to produce a first processed data portion;
processing, by a second circuit of the integrated circuit different than the first circuit, a second data portion during a second processing run of the series of processing runs to produce a second processed data portion, wherein the second data portion is the same as or different than the first data portion;
comparing the first processed data portion and the second processed data portion; and
determining, based on the comparison, that either the first circuit or the second circuit comprises a persistent fault;
translating, during the first processing run, a first virtual address associated with the first data portion to a first physical address associated with the first circuit;
translating, during the second processing run, the same first virtual address associated with the second data portion to a second physical address associated with the second circuit, wherein the second physical address is different than the first physical address, wherein the translating during the second processing run further comprises:
translating, during the second processing run, the same first virtual address associated with the first data portion to the first physical address associated with the first circuit; and
replacing one or more higher order bits of the first physical address with different higher order bits to create the second physical address associated with the second circuit.

11. The method of claim 10, wherein the second data portion is the same as the first data portion.

12. The method of claim 10, wherein the first circuit comprises a first portion of memory, and wherein the second circuit comprises a second portion of memory.

13. A method, comprising:
processing, by a first circuit of an integrated circuit, a first data portion during a first processing run of a series of processing runs to produce a first processed data portion;
processing, by a second circuit of the integrated circuit different than the first circuit, a second data portion during a second processing run of the series of processing runs to produce a second processed data portion, wherein the second data portion is the same as or different than the first data portion;
comparing the first processed data portion and the second processed data portion; and
determining, based on the comparison, that either the first circuit or the second circuit comprises a persistent fault,
wherein the first circuit comprises a first portion of memory, and wherein the second circuit comprises a second portion of memory, and
wherein the first data portion is associated with a first address during the first processing run, wherein the second data portion is initially associated with the same first address during the second processing run, wherein the first address is associated with the first portion of memory, wherein a second address is associated with the second portion of memory, the method further comprising modifying, during the second processing run, the same first address associated with the second data portion to produce a different second address, wherein the second address is associated with the second data portion during at least part of the second processing run.

14. The method of claim 13, wherein the second data portion is the same as the first data portion.

15. The method of claim 13, wherein the first circuit comprises a first processing unit, and wherein the second circuit comprises a second processing unit.

16. The method of claim 10, wherein the first circuit comprises a first processing unit, and wherein the second circuit comprises a second processing unit.

17. A method, comprising:
receiving a first data portion associated with a first address during a first processing run of a series of processing runs;
providing the first data portion to a first integrated circuit during the first processing run, based at least in part on the first address;

handling, by the first integrated circuit, the first data portion during the first processing run to produce a first handled data portion;

receiving a second data portion associated with the first address during a second processing run of a series of processing runs, wherein the second data portion is the same as or different than the first data portion;

modifying, during the second processing run, the first address associated with the second data portion to produce a second address associated with the second data portion;

providing the second data portion to a second integrated circuit during the second processing run, based at least in part on the second address;

handling, by the second integrated circuit, the second data portion during the second processing run to produce a second handled data portion; and determining whether either the first integrated circuit or the second integrated circuit comprises a persistent fault, at least in part, by comparing the first handled data portion with the second handled data portion.

18. The method of claim 17, wherein the second data portion is the same as the first data portion.

19. The method of claim 17, wherein the first integrated circuit comprises a first portion of memory, and wherein the second integrated circuit comprises a second portion of memory.

20. The method of claim 17, wherein the first integrated circuit comprises a first processing unit, and wherein the second integrated circuit comprises a second processing unit.

* * * * *